Figure 1:
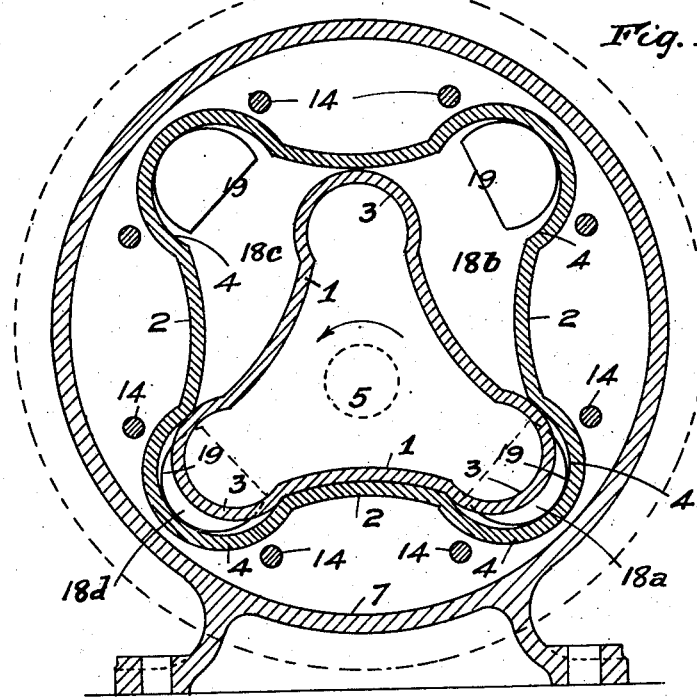

E. FEUERHEERD.
ROTARY MOTOR OR PUMP.
APPLICATION FILED JUNE 10, 1919.

1,389,189.

Patented Aug. 30, 1921.
5 SHEETS—SHEET 1.

Inventor:
Ernest Feuerheerd.

E. FEUERHEERD.
ROTARY MOTOR OR PUMP.
APPLICATION FILED JUNE 10, 1919.

1,389,189.

Patented Aug. 30, 1921.
5 SHEETS—SHEET 2.

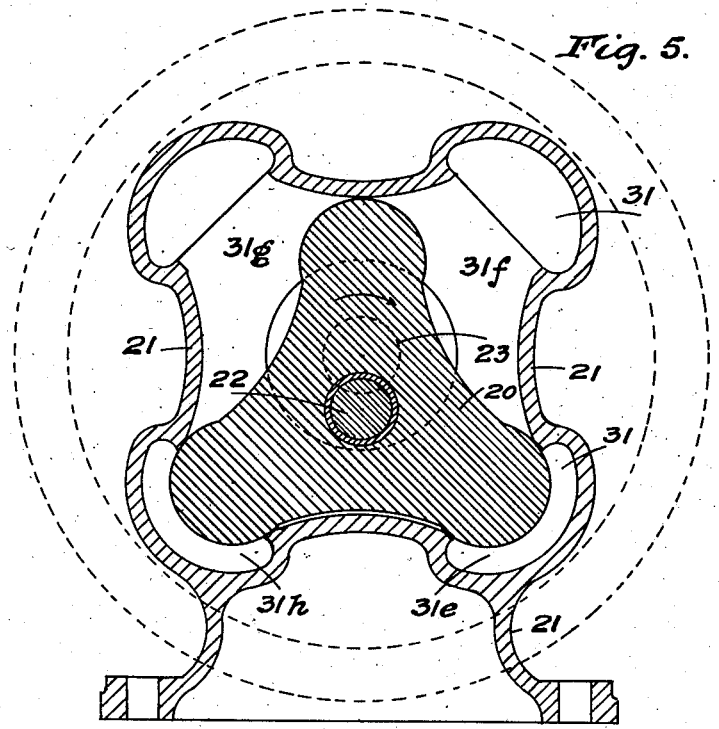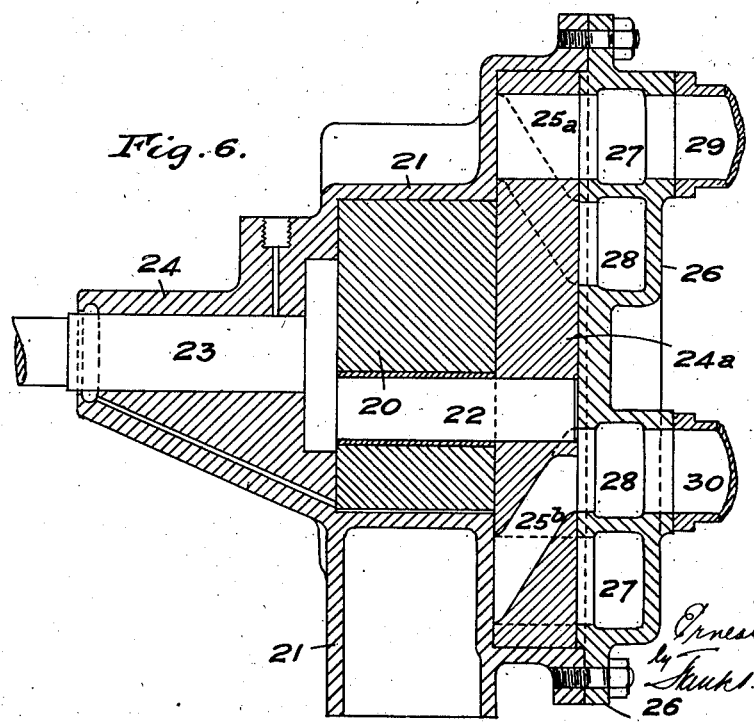

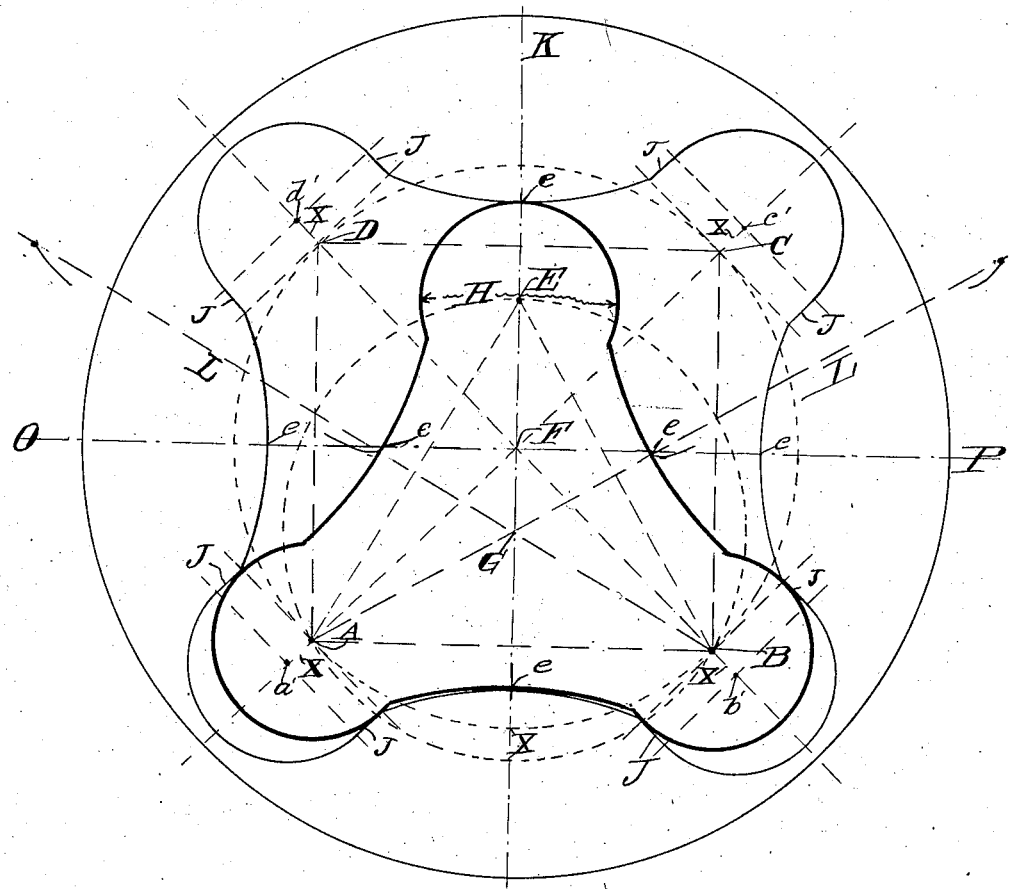

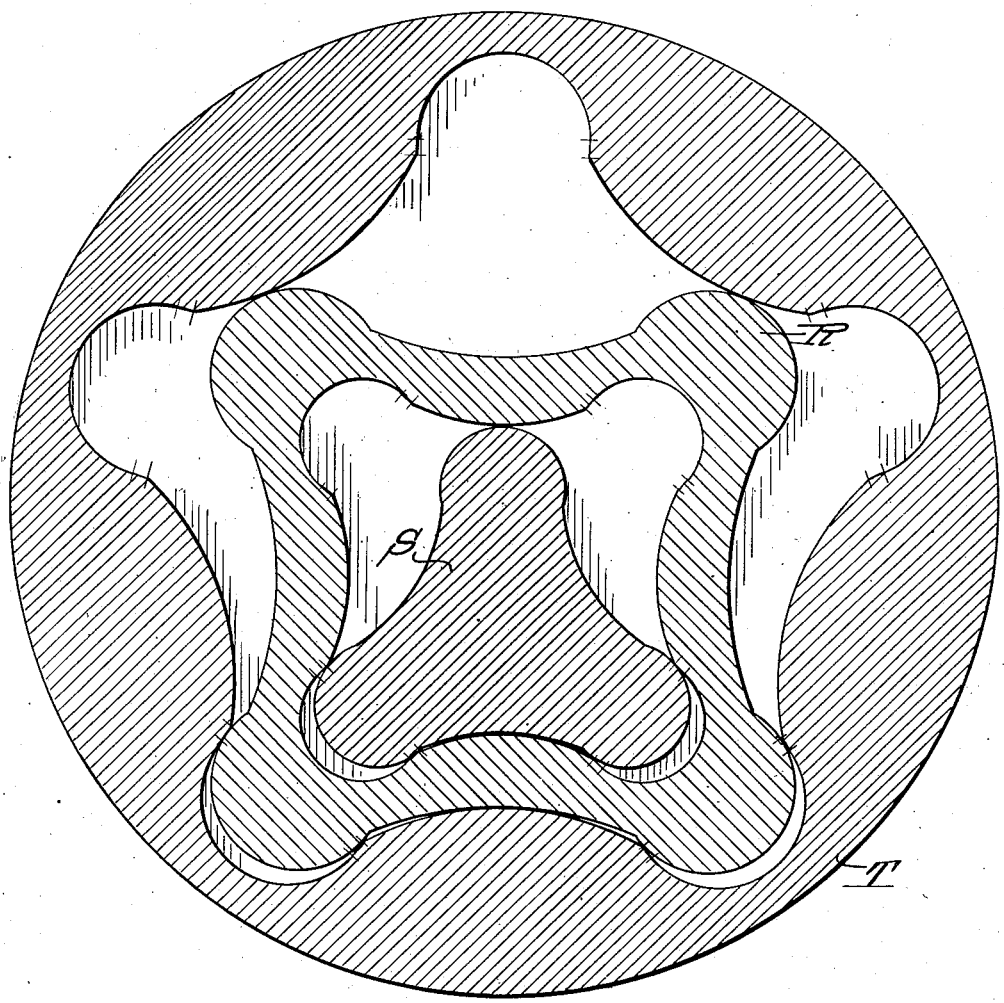

UNITED STATES PATENT OFFICE.

ERNEST FEUERHEERD, OF WALTON, ENGLAND.

ROTARY MOTOR OR PUMP.

1,389,189.   Specification of Letters Patent.   Patented Aug. 30, 1921.

Application filed June 10, 1919. Serial No. 303,198.

*To all whom it may concern:*

Be it known that I, ERNEST FEUERHEERD, of Walton, 50 Lower Oldfield Park, Bath, England, a subject of the King of Great Britain, and a resident of Bath, England, have invented certain new and useful Improvements in and Relating to Rotary Motors on Pumps, of which the following is a specification.

This invention relates to rotary motors or turbines or the like fluid operated motors, rotary pumps, gas compressors, vacuum pumps, blowing engines, and the like, and while the invention is primarily designed for use as such motors, or turbines, pumps, compressors, engines, and the like, by using in conjunction therewith the necessary control valves or other devices, the apparatus may be used as and for variable speed mechanisms, transmission or reduction gears, differential gears, fluid brakes, disengaging clutches, and such other devices wherein this apparatus may be used as a component part or as component parts together with control valves, connections or like devices.

According to this invention, the apparatus comprises inner and outer elements, these being disposed so that both the inner and the outer elements may be rotated in conjunction with each other, or they may be so disposed that either the inner or the outer elements may be fixed as regards rotary motion either the inner or the outer elements then being the only ones which may rotate. The inner and the outer elements are disposed eccentrically in relation to each other and the inner elements are provided with projections of any desired number, such projections being either an integral part of the inner elements and of any desired shape or they may be built up together with the inner elements and be of any desired shape or may be of the roller type or the like suitably mounted or carried and in all cases disposed equi-angularly relatively to each other. The outer elements are provided with a series of recesses also equi-angularly disposed relatively to each other with which the projections on the inner elements engage successively when rotation takes place, these recesses being of any desired shape and of any desired number but preferably the number of recesses in the outer elements are one more than the number of projections on the inner elements for each corresponding pair of such elements.

Taking a single pair of elements disposed so that both may be rotated in conjunction with each other as an instance, the operation is as follows. The inner element in rotating engages each of its projections into successive recesses in the outer element and a differential relative rotational speed is thus set up between the inner and outer elements. This relative rotational movement of the inner and outer elements results in a series of pockets being opened and closed sequentially, these pockets being formed between the exterior surfaces of the inner element and the inner surfaces of the outer element and such pockets communicating by way of ports or valves or the like formed or placed in either the inner or outer elements or in both and in a surrounding casing of the apparatus with the inlet and outlet passages of the apparatus. When the apparatus is used as a rotary motor or turbine or the like fluid operated motor, the fluid under pressure acting upon the exterior surfaces of the inner element and upon the inner surfaces of the outer element drives the inner and outer elements rotationally, the resulting power being taken as is desired from either one or the other or from both of these rotary elements. Or when the apparatus is used as a rotary pump, gas compressor, vacuum pump, blowing engine, or the like, by driving either one or the other or both of the inner and outer elements from an outside source of power, the alternate opening and closing of the pockets between the surfaces of the inner and outer elements effect the suction and delivery of the fluid which is being dealt with.

Figure 2:
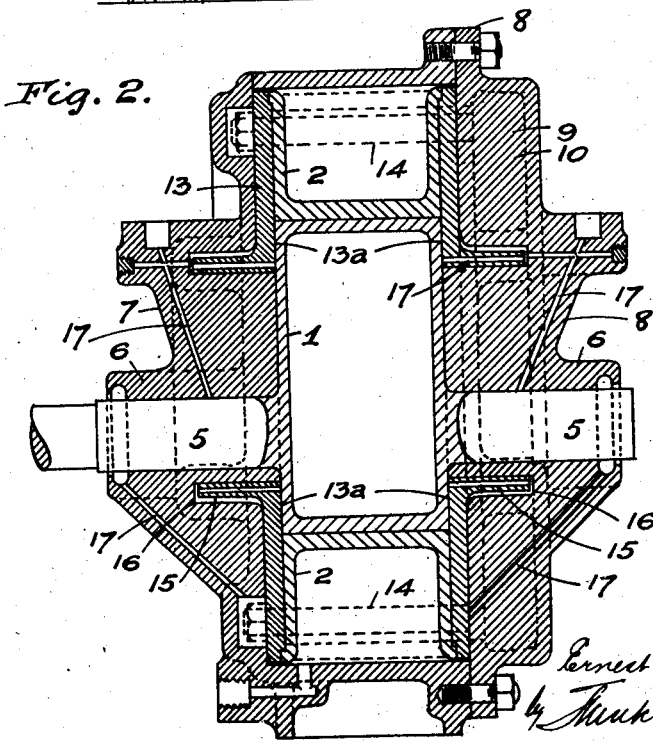
Figure 3:
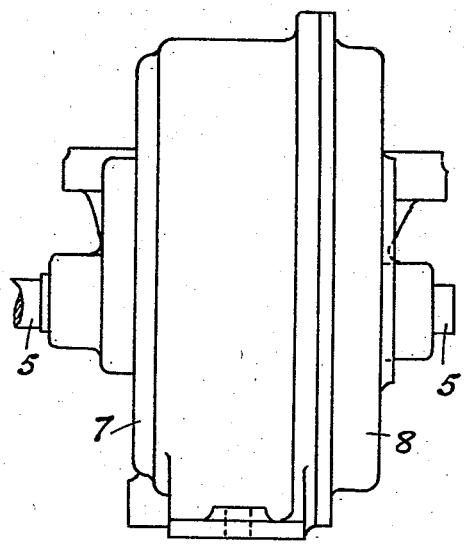
Figure 4:
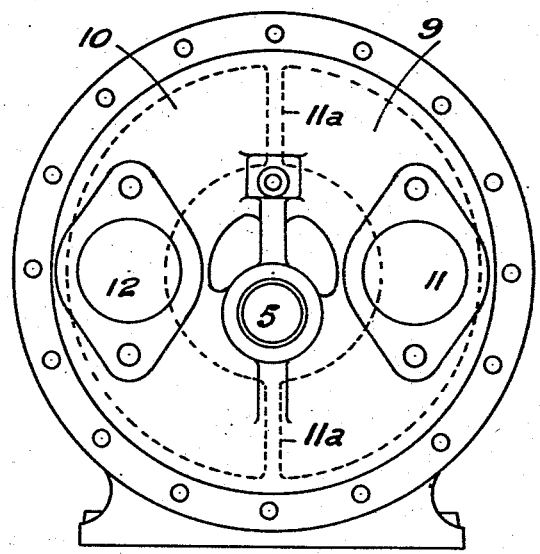
Figure 7:
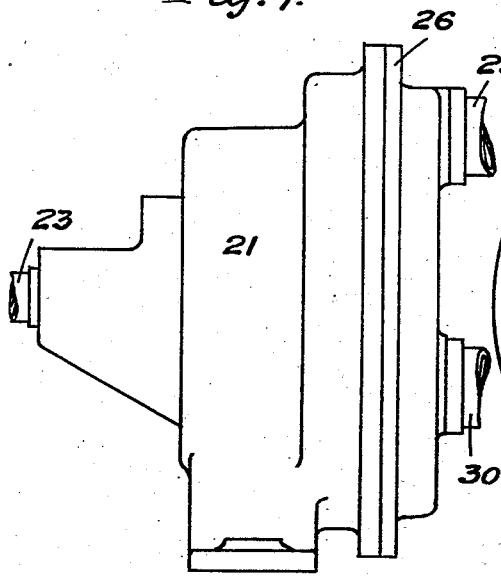
Figure 8:
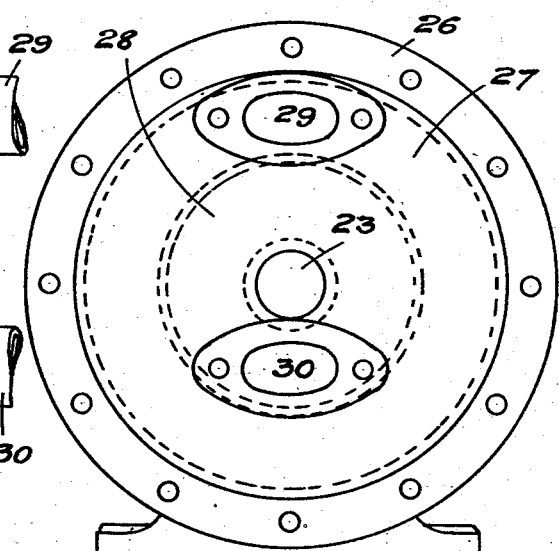

A form of apparatus in accordance with this invention and as previously stated is illustrated in Figures 1, 2, 3 and 4, the drawings showing the invention as it may be applied to rotary motors or turbines or the like fluid operated motors, rotary pumps, gas compressors, vacuum pumps, blowing engines, and the like, or as a component part of such other devices as are hereinbefore mentioned in which the inner and outer elements are disposed so that both are rotated in conjunction with each other. Fig. 1 is a sectional elevation of such an apparatus, Fig. 2 is a cross section through Fig. 1, Fig. 3 being an exterior side view, Fig. 4 being an end elevation showing inlet and outlet passages, Figs. 3 and 4 being to a reduced scale. Fig. 5 is a sectional elevation of an apparatus embodying the invention to produce rotary motors or turbines; Fig. 6 is a cross sectional view thereof; Fig. 7 is an elevation of the exterior of the said apparatus; Fig. 8 is an end elevation of the invention, showing the inlet and outlet passages; Fig. 9 is a diagrammatic view illustrating the formula for determining the relation of parts and their configurations, and Fig. 10 is a sectional view of a modified construction.

In carrying out the invention as illustrated by the before mentioned drawings Figs. 1, 2, 3 and 4, the apparatus comprises an inner element 1 and an outer element 2 both of which being disposed so that they may be rotated in conjunction with each other. The inner element is provided with a series of projections 3, in this illustration, three in number and of bulbous form and disposed equi-angularly relatively to each other and the outer element is provided with a series of recesses 4, in this illustration four in number, with which the projection 3 of the inner element successively engages when rotation of the inner and outer elements takes place. The inner element 1 is shown fitted to or formed integral with the shaft 5. If desired however the inner element may be disposed upon the shaft 5 in such manner that while rotary motion in conjunction with the shaft 5 takes place that it may be free as regards end motion relatively to the shaft 5. The inner element may be constructed as shown in Figs. 1 and 2 or it may be divided into a series of plates or the like or constructed in such alternative manner as may be mentioned and provided. The shaft 5 is free to rotate in bearings 6 provided in the casing 7 and in the removable side cover 8. The bearings 6 may be of the plain type, as shown in the drawing, or these bearings may be of the ring oiled type or may be of the ball or roller type or as may be desired to suit special working conditions. The removable side cover 8 is provided with two chambers 9 and 10, Figs. 2 and 4, which chambers communicate with inlet and outlet passages 11 and 12 and also with the pockets 18 which latter are formed between the surfaces of the inner and outer elements 1 and 2 when rotary motion takes place. The outer element 2, which may be of channel cross section as shown in Fig. 2, is shown provided with side plates 13, Fig. 2, which are held to the outer element 2 by bolts 14 or may be attached to the outer element in any other desired manner so that these side plates partake of the rotary motion of the outer element. The side plates 13 project inward at 13ª so as to overlap the periphery of the inner element and bearings are provided for the outer element 2 by forming with, as shown, or attaching to the side plates 13 annular flanges or bearing rings 15 which are free to rotate in annular bearing recesses 16 formed in the casing 7 and in the removable side cover 8. These bearings may be of the plain type, as shown in the drawing, or these bearings may be of the ring oiled type or may be of the ball or roller type or as may be desired to suit special working conditions. Suitable oil ducts 17 are indicated in the drawing, Fig. 2, for the lubrication of the bearings of the inner and outer elements and of the engaging surfaces of the inner and outer elements and the faces of the casing 7 and the removable side cover 8. If desired one of the side plates 13 may be formed integral with the outer element 2 or such side plates may be dispensed with altogether, the bearing or bearings of the outer element being then disposed around the outer diameter of the outer element and being either of the plain cylindrical type or of the ball or roller type or as desired. The inner and outer elements may be provided with bearings on either side, as illustrated in the drawing Fig. 2, or such bearings may be on one side only either as regards one or the other of the elements or as regards both of same, the bearing or bearings of the outer element 2 being disposed eccentrically in relation to the shaft 5 of the inner element 1. A removable side cover similar to 8 may also be provided on the other side of the casing 7 and it may be provided with chambers such as 9 and 10 communicating with inlet and outlet passages such as 11 and 12 or it may only have provision for a bearing or bearings supporting the inner and outer elements or both as hereinbefore described and the casing 7 only may be provided with chambers such as 9 and 10 or a casing and removable side cover or covers may be so provided as is desired and the casing 7 may be substantially constructed as shown in drawings or it may be built up or divided in any other desired manner and provided with means for support or attachment as shown or with such other means as may be desired to suit special conditions.

When the inner element 1 is caused to rotate about its own center the bulbous projections 3 on the inner element sequentially enter and recede from the recesses 4 in the outer element 2, the latter at the same time being caused to rotate about its own center but at a relatively slower speed to that of the inner element. the number of revolutions of the elements during any period varying in proportion to the number of projections and recesses on and in the inner and outer elements respectively. While rotation as described is taking place pockets 18 are alternately opened and closed, such pockets being formed between the exterior surfaces of the inner element 1 and the inner surfaces of the element 2 and, as shown in the drawing Fig. 2, by the faces of the side plate 13 of the outer element. Where such plates are dispensed with the pockets may be bounded laterally by the faces of the casing 7 and of the removable side cover 8 or faces adapted to act in like manner as desired. Supposing for instance that the inner element 1 is rotated in the direction of the arrow, Fig. 1, the outer element 2 will also rotate in the direction of the arrow and the pocket $18^a$ will have slightly opened and the pocket $18^b$ will have considerably opened while the pocket $18^c$ will have slightly closed and the fourth pocket $18^d$ is approaching the position wherein its capacity will be at the minimum. Each pocket reaches its minimum capacity at the point during rotation when a radial line drawn through a projection on the inner element coincides with a radial line drawn through a recess in the outer element and will increase and then decrease in its capacity during the rotation of the inner and outer elements until the before mentioned point is again reached. The inlet and outlet passages 11 and 12 as previously mentioned open into or communicate with the semi-cylindrical chambers 9 and 10 which are separated by the diaphragms $11^a$. Therefore as the pockets $18^a$ and $18^b$ are increasing in capacity while being on the right hand side of the diaphragms $11^a$ these pockets are in communication by means of the ports 19 in side plates 13 of the outer element 2 with the chamber 9, or by means of valves or the like suitably disposed and adapted to communicate with a chamber or chambers having a like purpose, fluid under pressure being admitted by means of inlet passages 11 enters the pockets $18^a$ and $18^b$ and acting upon the exterior surfaces of the inner element and upon the inner surfaces of the outer element causes the pockets to sequentially increase to their maximum capacity and in so doing the inner and outer elements rotate about their respective centers. At the same time the pockets $18^c$ and $18^d$ are decreasing in capacity while being on the lefthand side of the diaphragms $11^a$ the latter pockets are in communication by means of the ports 19 in side plates 13 with the chamber 10, or by means of valves or the like suitably disposed and adapted to communicate with a chamber or chambers having a like purpose, and the pockets $18^c$ and $18^d$ are therefore while decreasing in capacity enabled to discharge or exhaust themselves by way of chamber 10 to the outlet passage 12. The foregoing description relates to rotary motors or turbines or the like fluid operated motors. When however the apparatus is driven from an outside source of power the action of the pockets is varied as follows. The pockets $18^a$ and $18^b$ while increasing in capacity and being as before described in communication with the chamber 9 or the like cause a suction action or negative pressure to develop in the chamber 9 and the inlet passage 11 and any passages attached thereto. Therefore a fluid as desired may be caused to enter the pockets as these sequentially increase until they reach their maximum capacity while at the same time the pockets $18^c$ and $18^d$ are decreasing in capacity and being as before described in communication with the chamber 10 or the like and the outlet passage 12 are enabled to discharge any fluid which may have entered the pockets formed between the surfaces of the inner and outer elements as hereinbefore described. The latter description relates to rotary pumps, gas compressors, vacuum pumps, blowing engines, or the like. In all cases when the elements are disposed so that they may be rotated in conjunction with one another, and in relation to the direction of rotation, a continuous opening takes place on the one side of the diaphragms $11^a$ and a continuous closing takes place on the other side of these diaphragms, the pockets opening or closing toward right or left hand of a center line passing through the centers of both inner and outer elements while rotation of these elements is taking place, thereby allowing inlet or outlet to take place to and from the pockets by way of ports or valves or the like communicating with chambers and passages adapted for such purpose as hereinbefore described and shown.

Taking a single pair of elements disposed so that while the inner element only may be rotated the outer element remains fixed as regards rotary motion as an instance, the operation is as follows. The inner element in rotating about a center eccentrically disposed with relation to the center of the outer element engages each of its projections into successive recesses in the outer element and in so doing the center of the inner element describes a circle around the center of the outer element. This eccentric path of the inner element results in a series of pockets being opened and closed sequentially, these pockets being formed between the exterior surfaces of the inner element and the inner surrfaces of the outer element, and these pockets communicate with ports or valves or the like formed or disposed on or in either the inner or the outer elements or both or in a disk or disks or the like adapted to rotate in conjunction with the inner element and either concentrically or eccentrically with the center of the outer element as is desired, and such ports, valves, or the like being so disposed that they communicate with chambers which in their turn communicate with the inlet and outlet passages of the apparatus. When the apparatus is used as a rotary motor or turbine or the like fluid operated motor, the fluid under pressure acting upon the exterior surfaces of the inner element and upon the inner surfaces of the outer element causes the inner element to be rotated both about its own center and eccentrically around the center of the outer element. If the inner element be carried or mounted upon a pin or the like forming part of or adapted to rotate with a shaft centrally disposed relatively to the outer element, the resulting power may be taken from such a shaft. When the apparatus is used as a rotary pump, gas compressor, vacuum pump, blowing engine, or the like, by driving the central shaft, which is adapted as described to carry the inner element around an eccentric path relatively to such central shaft, from an outside source of power, the alternate opening and closing of the pockets formed between the surfaces of the inner and outer elements effect the suction and delivery of the fluid which is being dealt with.

In carrying out the invention as illustrated by the before mentioned drawings, Figs. 5, 6, 7 and 8, the apparatus comprises an inner element 20 and an outer element 21, the inner element being disposed so that it may be rotated about its own center while at the same time it describes an eccentric path around the center of the outer element. The outer element is fixed as regards rotary motion and is provided with means by which it may be supported or attached in any desired position. The inner and outer elements are provided with projections and recesses respectively similar to those described and shown in the description and drawings appertaining to the apparatus wherein both inner and outer elements may be rotated in conjunction with each other. But in this instance the projections on the inner element 20 successively engage with the recesses in the outer element 21 when the inner element is caused to describe an eccentric path around the center of the outer element while at the same time the inner element is caused to rotate about its own center. The inner element 20 is shown carried or mounted upon a pin 22 forming part of or adapted to rotate with a shaft 23, the pin 22 being disposed eccentrically in relation to the shaft 23. The bearing of the inner element upon the pin 22 may be of the plain type, as shown in the drawing, or may be of the ring oiled type or may be of the ball or roller type as may be desired to suit special working conditions. The inner element may be constructed as shown in Fig. 5, or it may be divided into a series of plates or the like or constructed in such alternative manners as may be mentioned and provided. The shaft 23 is free to rotate in a bearing 24 provided in the outer element 21 or adapted to be carried by the outer element. This bearing may be of the plain type, as shown in the drawing, or it may be of the ring oiled type or may be of the ball or roller type or as may be desired to suit special working conditions. A circular disk or the like 24ᵃ is provided and is preferably mounted concentrically relatively to the shaft 23 and is disposed or connected so that it partakes of the rotary motion of the shaft 23. The disk 24ᵃ is provided with ports 25ᵃ and 25ᵇ and is disposed so that it rotates against the face of a removable side cover 26. This cover is provided with annular chambers 27 and 28, the said chambers being adapted so that they communicate with the ports in the disk 24ᵃ. The annular chambers 27 and 28 communicate with inlet and outlet passages 29 and 30 and also by way of ports in the disk 24ᵃ with the pockets 31, which latter are formed between the surfaces of the inner and outer elements 20 and 21, when rotation of the shaft 23 and the inner element 20 is caused to take place as previously described. The outer element 21 is provided with means for support or attachment as shown in drawings or these may be of any desired type to suit special conditions. If desired the pin carrying the inner element may be formed as a part of or attached to a double ended shaft, the latter being free to rotate in suitable bearings provided in the outer element and the removable side cover respectively. The outer element may be constructed substantially as shown in the drawings Figs. 5, 6, 7, and 8, or it may be provided with removable side covers of suitable type on either side or on both and these removable side covers may be either or both provided with chambers adapted to communicate with inlet or outlet passages similar to those indicated by 29 and 30 on Fig. 8, and also by way of ports in a disk or disks, similar to the one shown in Fig. 6, with the pockets 31.

When the inner element 20 is caused to rotate about its own center and at the same time to move in an eccentric path relatively to the center of the outer element the bulbous projections on the inner element sequentially enter and recede from the recesses in the outer element 21. While such rotation and eccentric movement is taking place pockets 31 are alternately opened and closed, such pockets being formed between the exterior surfaces of the inner element 20 and the inner surfaces of the outer element 21. Supposing for instance that the shaft 23 be caused to rotate in the direction of the arrow Fig 5, then the center of the inner element 20 will describe a circle around the center of the outer element 21 while at the same time the inner element will rotate about its own center in a contraverse direction to that of the arrow previously mentioned. Then the pocket 31$^e$ will have slightly opened and the pocket 31$^f$ will have considerably opened while the pocket 31$^g$ will have slightly closed and the fourth pocket 31$^h$ is approaching the position wherein its capacity will be at the minimum. Each pocket reaches its minimum capacity at a point during the rotation of the shaft 23 when a radial line drawn through a projection on the inner element coincides with a radial line drawn through a recess in the outer element and will increase and then decrease in its capacity while the inner element describes the before mentioned path around the center of the outer element until such a coinciding point relating to the inner and outer elements is again reached. The inlet and outlet passages 29 and 30 as previously mentioned open into or communicate with the annular chambers 27 and 28 and also by way of ports 25$^a$ and 25$^b$ in the disk 24$^a$ with the pockets 31$^e$, 31$^f$, 31$^g$ and 31$^h$. Therefore the pockets 31$^e$ and 31$^f$ while increasing in capacity are in communication by way of the ports in the disk 24 with either one or the other of the annular chambers in the side cover 26 and the pockets 31$^g$ and 31$^h$ while decreasing in capacity are in communication by way of the ports in the disk 24$^a$ with either one or the other of the annular chambers in the side cover 26. When, therefore, fluid under pressure is enabled to enter the pockets 31$^e$ and 31$^f$ this fluid acts upon the surfaces of the inner and outer elements causing the pockets to sequentially increase to their maximum capacity and in so doing the inner element is caused to rotate about its own center and its center is caused to describe an eccentric path around the center of the outer element and thus giving a rotary motion to the shaft 23. At the same time the pockets 31$^g$ and 31$^h$ while decreasing in capacity are in communication by way of the ports in the disk 24 with either one or the other of the annular chambers in the side cover 26 and the pockets 31$^g$ and 31$^h$ are therefore enabled to discharge or exhaust themselves into the passages 29 and 30 and the chambers 27 and 28 being adapted to become either the inlet or the outlet as is desired relatively to the disposition of the ports 25$^a$ and 25$^b$ in disk 24$^a$. The foregoing description relates to rotary motors or turbines or the like fluid operated motors. When however such apparatus is driven from an outside source of power the action of the pockets is varied as follows. The pockets 31$^e$ and 31$^f$ while increasing in capacity are enabled to cause a suction action or negative pressure to develop in either one or the other of the annular chambers 27 and 28 and in either one or the other of the passages 29 and 30. Therefore a fluid as desired may be caused to enter these pockets as these sequentially increase until they reach their maximum capacity while at the same time the pockets 31$^g$ and 31$^h$ are decreasing in capacity and being as hereinbefore described in communication with either one or the other of the annular chambers 27 and 28 and with either one or the other of the passages 29 and 30 are enabled to discharge any fluid which may have entered the pockets formed between the surfaces of the inner and outer elements as hereinbefore described. The latter description relates to rotary pumps, gas compressors, vacuum pumps, blowing engines, or the like. The outer element only may be provided with chambers adapted to communicate as previously described with the pockets formed between the inner and outer elements or an outer element and removable side cover or covers may be so provided as is desired.

In a modification of this invention as applied to the latter instance the recesses in the outer element or its side face or cover or both of its side covers may be provided with ports or with inlet or outlet valves or the like or with both, and such ports, valves, or the like adapted to communicate with inlet or outlet passages or with both or with chambers communicating with such inlet or outlet passages as is desired. In such a modification the ports, valves, or the like, together with such chambers or passages, may be used in conjunction with the rotating disk or disks hereinbefore mentioned or may be used in place of such disk or disks. In a further modification of this invention as applied to the latter instance the inner element may be provided with a port or ports or with an inlet or outlet valve or valves or the like or with both and such ports, valves, or the like adapted to communicate with the sequentially opening and closing pockets formed between the inner and outer elements. In such a modification the port or ports or valve or valves or the like provided on or in the inner element may be used in conjunction with ports or valves or the like provided on or in the outer element and in the rotating disk or disks hereinbefore mentioned or may be used in conjunction with either the one or the other of the latter or may be used in place of both.

Taking a single pair of elements disposed so that while the outer element only may be rotated the inner element remains fixed as regards rotary motion as an instance the operation is as follows. The outer element in rotating about a center eccentrically disposed with relation to the center of the inner element engages each of its recesses successively with the projections on the inner element and in so doing the center of the outer element describes a circle around the center of the inner element. This eccentric path of the outer element results in a series of pockets being opened and closed sequentially, these pockets being formed between the exterior surfaces of the inner element and the inner surfaces of the outer element, and these pockets communicate with ports or valves or the like formed or disposed on or in either the inner or the outer elements or both or in a disk or disks or the like adapted to rotate in conjunction with the outer element and either concentrically or eccentrically with the center of the inner element as is desired or in all or any of such elements or disk or disks and such ports, valves, or the like being so disposed that they communicate with the inlet and outlet passages of the apparatus. When the apparatus is used as a rotary motor or turbine or the like fluid operated motor, the fluid under pressure acting upon the exterior surfaces of the inner element and upon the inner surfaces of the outer element causes the outer element to be rotated both about its own center and eccentrically around the center of the inner element. And as the outer element may be carried or mounted upon a pin or pins or the like forming part of or adapted to rotate with a shaft centrally disposed relatively to the inner element, the resulting power may be taken from such a shaft or may be taken from the outer element in such manner as is desired. Or when the apparatus is used as a rotary pump, gas compressor, vacuum pump, blowing engine, or the like, by driving from an outside source either the outer element or a central shaft which may be adapted as described to carry the outer element around an eccentric path relatively to such central shaft. the alternate opening and closing of the pockets formed between the surfaces of the inner and outer elements effect the suction and delivery of the fluid which is being dealt with. A casing or the like may be used either partially or wholly inclosing the inner and outer elements and such casing may be provided with chambers or the like so disposed and adapted as to communicate with the ports or valves or the like previously mentioned and with the inlet or outlet passage or passages or both of the apparatus.

In all the foregoing instances and modifications thereof the surfaces of both the inner and the outer elements are so disposed and adapted that they remain in close proximity to or touching each other at such points during the rotation as is necessary to effectively form the sequentially opening and closing pockets and also so that the inner and outer elements may rotate in conjunction as described in one form of this invention or that one or the other may rotate while the other element remains fixed as regards rotary motion as described in other forms of this invention. And as may be desired or necessary the inner or the outer elements or both or the faces of the casing or covers or both or all or any of these may be provided with suitable devices having for their object the maintaining of pressure tight contact at any desired point or points.

The methods appertaining to the setting out or construction of the projections on the inner elements and the recesses in the outer elements are now more particularly described and ascertained. When the projections on the inner element are two in number and the recesses in the outer element are three in number an equilateral triangle of desired base is constructed and the projections on the inner element are disposed about the ends of the line of the base of the triangle and are preferably of radial shape, the centers of the radii being at the ends of such base line, or a line of the same length. The recesses in the outer element are disposed adjacent to the corners of the triangle and may extend therefrom for a necessary distance upon lines drawn from the center of the triangle through the corners of the triangle.

When the projections on the inner element are three in number and the recesses in the outer element are four in number a square of desired base is constructed and upon its base line and inside the square is also constructed an equilateral triangle. The projections on the inner element are disposed about the corners of the triangle, or of a triangle of the same size, and are preferably of radial shape, the centers of the radii being at the corners of such triangle, while the recesses in the outer element are disposed adjacent to the corners of the square and may extend therefrom for a necessary distance upon lines drawn from the center of the square through the corners of the square.

In order that the method of carrying the invention into practice may be more fully understood, reference is had to the accompanying drawing and particularly to Fig. 9 thereof, which illustrates the manner of determining the relations of parts and their configurations, in explanation of which the following description is supplied, viz: This explanation gives the determination of three points in the arc J e J, in the particular case illustrated in the diagram, Fig. 9, and the following steps are to be taken:

1. Construct a square A B C D.
2. Construct an equilateral triangle A B E on the base of the square.
3. Find the center F of the square by drawing the diagonals A C and B D prolonging these diagonals beyond the corners of the square.
4. Draw the vertical M N and the horizontal O P.
5. Find the center G of the triangle and prolong the dividing lines A G and B G as shown.

6. Describe a circle with F as center and F A as radius through the corners of the square.

7. Describe a circle with G as center and G A as radius through the corners of the triangle.

8. These two circles cut the vertical line M N below the base of the square at X and for convenience, this short line shall be called X.

9. Project X on the diagonals of the square beyond the corners of the square, thus obtaining the points $a'$ $b'$ $c'$ and $d'$.

10. Describe circles around the corners of the triangle, the area of each of these three circles to be one-fifth of the area of the square. This gives the diameter H.

11. With the same radius describe semi-circles with the points $a'$ $b'$ $c'$ and $d'$ as centers beyond the corners of the square.

12. Prolong these semi-circles parallel to the diagonals of the square and in length equal to X, as shown on the accompanying drawing and marked J.

13. The circumference of the circle around the apex E of the triangle A B E cuts the vertical M N at a point marked $e$; set out this point equidistant from F on the horizontal O P and on the vertical M N below the base of the square.

14. With the height of the triangle as radius, describe the curves J $e$ J.

15. Describe a circle with F as center of suitable radius, thus completing the outer rotor.

16. Set out the point $e$ below the center of the base of the square, equidistant from G on the dividing lines of the triangle.

17. With the base of the square as radius, describe the curves joining the circles around the corners of the triangle and passing through $e$ on the dividing lines of the triangle as shown. This completes the inner rotor. And similar methods are adopted when the projections of the inner rotor are increased or decreased in diameter.

When the projections on the inner element are four in number and the recesses in the outer element are five in number a pentagon of desired base is constructed and upon its base line and inside the pentagon is also constructed a square. The projections on the inner element are disposed about the corners of the square, or of a square of the same size, and are preferably of radial shape, the centers of the radii being at the corners of such square, while the recesses in the outer element are disposed adjacent to the corners of the pentagon and may extend therefrom for a necessary distance upon lines drawn from the center of the pentagon through the corners of the pentagon. When the projections on the inner element are five in number and the recesses in the outer element are six in number a hexagon of desired base is constructed and upon its base line and inside the hexagon is also constructed a pentagon. The projections on the inner element are disposed about the corners of the pentagon, or of a pentagon of the same size, and are preferably of radial shape, the centers of the radii being at the corners of such pentagon; while the recesses in the outer element are disposed adjacent to the corners of the hexagon and may extend therefrom for a necessary distance upon lines drawn from the center of the hexagon through the corners of the hexagon.

Like methods are used when the numbers of the projections and recesses on and in the inner and outer elements are greater than those specifically mentioned hereinbefore and relatively to the figures upon or around which the said projections or recesses are disposed. In all cases the outer ends of the recesses in the outer elements may be of such desired or necessary shapes as may be best adapted for varying purposes or conditions. And the recesses in the outer elements are connected as between adjacent recesses by curved paths, these paths being constructed so that the projections on the inner elements remain in close proximity to or touching such paths while the projections are sequentially caused to pass from recess to recess by the rotation of the inner or the outer element or of both.

When apparatus in accordance with this invention, and generally as is set forth, illustrated or ascertained in the description and drawings, is used as and for rotary motors or turbines or the like fluid operated motors, rotary pumps, gas compressors, vacuum pumps, blowing engines, and the like, such apparatus may be used singly or a combination or combinations of such apparatus may be used. Therefore an outer element R rotating in conjunction with an inner element S may be provided with projections upon its outer surface and these projections disposed to sequentially enter and recede from recesses in another outer element T in such manner that the first mentioned outer element becomes a combination of an inner and an outer element. Or the outer surface of an outer element may be adapted so that it can be surrounded in such manner as is desired by the interior surface of an inner element, the latter being adapted or disposed so that its projections sequentially enter and recede from recesses in another outer element. And such combinations may be multiplied by using as previously mentioned such further inner and outer elements as is desired and such a combination or combinations may be adapted to act in conjunction with each other or separately either as regards the operating fluid or as regards the fluid or fluids which are being dealt with. Furthermore a combination or combinations of such apparatus may be used wherein two or more of such apparatus are disposed so that they may drive or may be driven by the same shaft or adapted to act in conjunction with one another either as regards the fluid operating the combination or combinations or as regards the fluid or fluids which are being dealt with. When a combination or combinations of such apparatus is used as a motor or turbine operated by a fluid such as steam or the like the disposition of the combined apparatus may be so that the rotary motor or turbine is of the compound or triple expansion or quadruple expansion type or as desired. Or when apparatus in accordance with this invention is used as a rotary motor or turbine of the internal combustion type single apparatus or a combination or combinations of such apparatus together with the necessary valves, ignition devices, connections or the like may be used acting upon the four-cycle principle, or single apparatus or a combination or combinations of such apparatus having charging or scavenging pumps or the like acting in communication therewith together with the necessary valves, ignition devices, connections or the like may be used acting upon the two-cycle principle, or a combination or combinations of such apparatus together with the necessary valves, ignition devices, connections and the like in which one or more apparatus may be used as a compressor or compressors supplying one or more apparatus adapted to utilize the expansion of the heated gases following ignition as a motive force and such internal combustion motors or turbines adapted as desired by means of valves or like devices so that they may use either combustible gases or vapors or liquid fuels or other explosives.

I claim:

1. Apparatus for use as a fluid operated motor or turbine; or a rotary pump, gas compressor, vacuum pump, blowing engine, or the like, comprising, an outer element having a series of equiangularly disposed recesses, ports in the outer element communicating with inlet and outlet chambers for the fluid, an outer casing for the outer element, inlet and outlet chambers in said casing, a disk revolubly mounted in the casing, ports in said disk adapted to put the ports in the outer element in communication with the inlet and outlet chambers, an inner element having a series of equiangularly disposed projections one less in number than the recesses in the outer element, said inner element rotating about its own center and revolving relatively to the outer element in a circular path about the center of the outer element, whereby the projections sequentially enter and recede from the recesses and a series of opening and closing pockets for the fluid are formed communicating with the inlet and outlet chambers.

2. In a rotary apparatus, in combination, casing provided with recesses in the interior surface of its peripheral wall and a member mounted within said casing eccentric thereto provided with projections upon its periphery adapted to engage the said recesses, the number of recesses exceeding the number of projections by one, whereby pumping chambers are formed between said casing and inner member, each of said chambers being constructed with suitable provision for ingress and egress of fluid, means for causing relative rotary motion of said casing and inner member, the said parts being so constructed and arranged that during such rotary motion, engagement between the inner surface of the casing and the outer surface of the inner member at points upon opposite sides of the ingress and egress of each pumping chamber is constantly maintained.

3. In a rotary apparatus, the combination with an outer member of an inner member contained therein and eccentric thereto, said inner member having three or more projections formed with cylindrical surfaces of more than semi-circular cross sections, and said outer member having a number of recesses greater by one than the number of said projections formed with flat surfaces with which the said cylindrical projections engage to form fluid tight pockets of varying capacity, means for mounting the members for relative rotary motion, the said cylindrical projections being formed about axes which pass through the corners of an equilateral polygon and said recesses being formed about axes which pass through the corners of an equilateral polygon having one more side, all of the sides of said polygons being of equal length.

In testimony whereof I affix my signature in presence of two witnesses.

ERNEST FEUERHEERD.

Witnesses:
A. ROBERTO LEWIS,
ELIZABETH FORTUNE.